Sept. 5, 1967  S. H. HERTZLER, JR  3,340,473
TEST FIXTURE FOR ELECTRICAL COMPONENTS HAVING
INDEPENDENTLY ADJUSTABLE JAW PAIRS
Filed Nov. 4, 1963
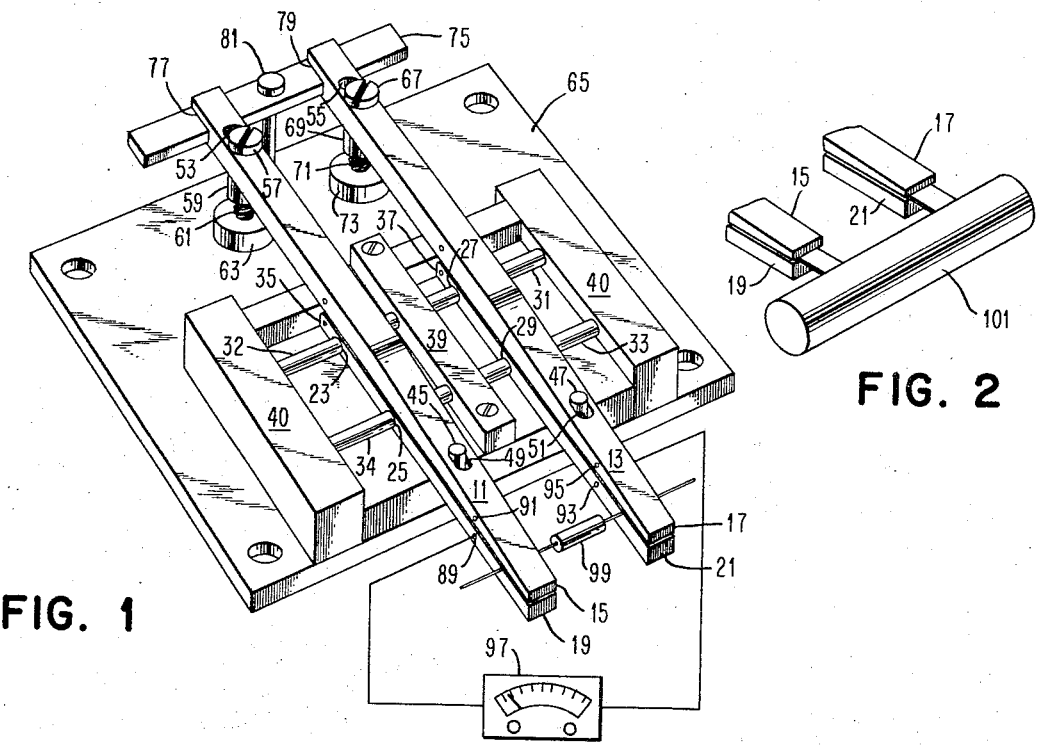
FIG. 1
FIG. 2
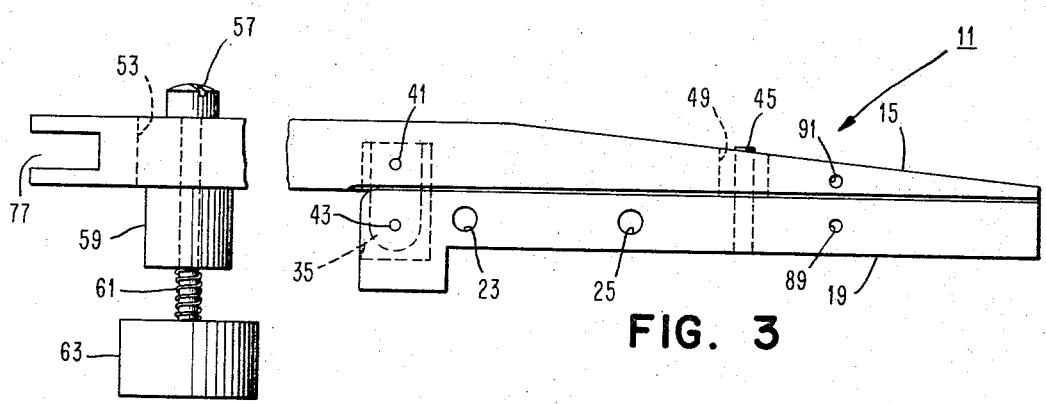
FIG. 3
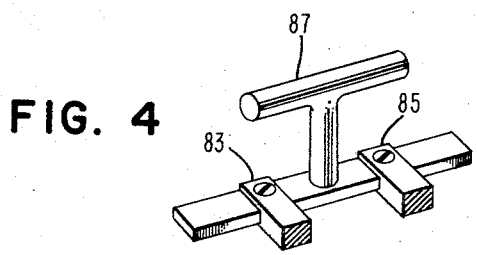
FIG. 4
INVENTOR
SAMUEL H. HERTZLER, JR.
BY *William E. Gleaver*
ATTORNEY

United States Patent Office 3,340,473
Patented Sept. 5, 1967

3,340,473
TEST FIXTURE FOR ELECTRICAL COMPONENTS HAVING INDEPENDENTLY ADJUSTABLE JAW PAIRS
Samuel H. Hertzler, Jr., Norristown, Pa., assignor to American Components, Inc., a corporation of Pennsylvania
Filed Nov. 4, 1963, Ser. No. 321,178
7 Claims. (Cl. 324—158)

This invention relates to testing tools and in particular to a device for testing resistors, capacitors, coils or the like which have lead wires, lugs or other electrical connections extending therefrom.

When electrical components, such as resistors, are mass produced, it is necessary to provide some means for rapidly testing these components during production. In the past the devices employed for rapidly testing components have generally all had some undesirable characteristics.

Primarily, the prior art component testers have all provided some unsatisfactory test results because the means for rapidly obtaining a good electrical connection between the component and the test circuit has been lacking especially without damage to the electrical connections. If a good electrical connection were to be assured for each test experience with the prior art device, the operator would be required to sacrifice time, in that he would have to painstakingly secure the component leads to the meter leads of the testing tool.

Further, the prior art tools did not accommodate various size components without either a time-consuming adjustment of the electrical contacts of the tool or, in the alternative, an arrangement whereby the components had extra long leads, or required the bending of the same to adapt to the testing device.

Finally, the prior art tools do not provide a single tool means for accommodating a component with leads extending from both ends as well as a component with lugs extending from the front of the component.

Accordingly it is an object of the present invention to provide an improved electrical component testing tool.

It is a further object of the present invention to provide an electrical component testing tool which can accommodate various sizes of components with a minimum of effort required to effect the various accommodations.

It is another object of the present invention to provide an electrical component testing tool which will insure a virtually identical, good, low resistance connection between each component to be measured and the testing circuit, with a minimum of effort required to effect said connection, while providing for a four terminal network as taught by Kelvin Bridge principles.

It is another object of the present invention to provide an electrical component testing tool which will accommodate an electrical component having lead wires extending from the ends thereof as well as components having lugs extending from the front portions thereof.

In accordance with a feature of the present invention there are provided two spring loaded pairs of contact jaws which are slideably connected to a pair of rods, which in turn are rigidly attached to a base member. The contact jaws can be easily moved independently along the rods away from one another or toward one another thereby enabling the contact jaws to readily accommodate various sizes of components.

In accordance with another feature of the present invention, the contact jaws are independently operable to insure that the maximum gripping force is applied to each lead wire or lug in order to insure a good electrical connection between each component lead wire and the testing circuit, and thereby adjust to variations of leads for the same considered component.

In accordance with another feature of the present invention the contact jaws have a guide stud disposed in a guide hole in each of the jaws which is capable of vertical movement. The guide studs function to insure that each of the vertical moving jaws closes squarely to provide the maximum jaw surface on each component lead wire or lug each time a test operation is undertaken.

In accordance with another feature of the present invention, the front ends of the contact jaws are squared off and are unobstructed which enables a component having lugs, for lead-in circuits or terminals, extending from its front portion to be readily gripped and therefore tested.

It is also possible to have more than two such adjustable jaws in such an arrangement as to provide more than two test connections such as are required for function circuits such as thin film microcircuits.

The foregoing and other objects and features of this invention will be best understood by reference to the following description of an embodiment of the invention taken in conjunction with the accompanying drawings, wherein:

Consider now FIGURE 1 which is a pictorial schematic of the present invention. In FIGURE 1 there are shown two pairs of contact jaws 11 and 13. Each pair of contact jaws is made up of an upper jaw and a lower jaw. Upper jaw 15 and lower jaw 19 make up contact jaws 11, while upper jaw 17 and lower jaw 21 make up contact jaws 13. In the preferred embodiment, the jaws 15, 17, 19 and 21 are made of brass and are approximately ⅜ of an inch wide. It should be understood that other good conducting metals might be used (as well as other dimensions) but I have found brass to be preferable because of its non-corrosive characteristics and its market availability.

The lower jaws 19 and 21 each have two guide rod apertures formed therein as can be seen better in FIGURE 3. The lower jaw 19 has guide rod apertures 23 and 25 therein, while the lower jaw 21 has guide rod apertures 27 and 29 therein. The guide rod apertures 23, 25, 27 and 29 fit the four guide rods 31, 32, 33 and 34 and slideably connect the contact jaws 11 and 13 to said guide rods or track means. Although four guide rods are used in the preferred embodiment it should be understood that two guide rods or possibly one guide rod can be used. The guide rods 31 and 32 appear as one guide rod in FIGURE 1 but actually are two rods each of which fits into a non-connected hole in block 39 (i.e., the holes in block 39 do not tunnel completely through the block). Block 39 is made of insulating material such as hard rubber, epoxy resin or the like and hence rod 31 is electrically isolated from rod 32. In a similar fashion rod 33 is insulated from rod 34. In accordance with the foregoing arrangement, rods 31 and 33 are not insulated from jaws 13 nor are rods 32 and 34 insulated from jaws 11, but there can be no short circuit between jaws 11 and 13 because of block 39. Obviously, the jaws could be insulated from the rods to enable a pair of rods, such as 31 and 32 to be replaced by a single rod, but because of the wear from sliding and rotating, I have found such an arrangement undesirable. The rods 31–34 are secured at their other ends in base 40 which is also an insulating material.

Since the jaw arrangements for each pair are similar only one pair of jaws are shown in FIGURE 3. As can be best seen in FIGURE 3, the upper jaws 15 and 17 are respectively connected to the lower jaws 19 and 21, each by means of an associated swivel adapter block 35 and 37. Jaws 15 and 19 (as well as jaws 17 and 21) may also be insulated from each other in order to accommodate four terminal measurements. This can be accomplished by providing pins 41 and 43 which are made of electrical insulating material or by making the adapter block 35 of electrical insulating material.

In a four terminal measurement the jaws make a top and bottom connection (voltage and current) to a lead placed under test, but when the jaws are closed they provide a short circuit on themselves. The features are desirable in a four terminal measurement.

Block 37 is not shown in FIGURE 3 but its position can be understood from FIGURES 1 and 3. Consider FIGURE 3 for an understanding of the mechanical assembly of a pair of jaws. When jaw 15 is moved in a vertical direction, the swivel adapter block 35, (which is connected to upper jaw 15 by pin 41 and to lower jaw 19 by pin 43) partially rotates on pin 43 to permit the jaws 11 to be opened. Although the jaws 17 and 21 are not shown in detail as in FIGURE 3 it should be understood that they are connected together and operate in an identical manner. Obviously when jaws 15 and 19 are closed the upper jaw 15 partially rotates back on pin 43.

In FIGURES 1 and 3 there can be seen guide pins 45 and 47. The guide pins 45 and 47 are respectively securely fastened to their associated lower jaws 19 and 21. Guide pin 45 passes through a guide aperture 49 in jaw 15, while the guide pin 47 passes through a guide aperture 51 in upper jaw 17. The guide pins 45 and 47 in conjunction with the apertures 49 and 51 insure that the upper jaws 15 and 17 fit squarely on the lower jaws 19 and 21. By insuring a square fit of the jaws, the present invention insures that the maximum conducting surface is available to the lead wires or lugs of the component being tested. If the upper jaw, for instance, were allowed to move sideways upon closing, the amount of contact surface applied to a lead wire would be reduced and hence the resistance at the jaw gripping point would be increased.

At the back end of each of the upper jaws 15 and 17 there is found a second aperture. Aperture 53 is found in upper jaw 15 and aperture 55 is found in upper jaw 17. Disposed in aperture 53 is screw 57. Screw 57 passes through a spring retainer 59, a spring 61 and is threaded into foot block 63. The foot block 63 is made of electrical insulating material such as hard rubber, epoxy resin or the like in order to prevent a short circuit between the upper jaws 15 and 17 via the metal base 65. Screw 67 which is disposed in upper jaw 17 in a like manner passes through a spring retainer 69, a spring 71 and is threaded into foot block 73 (also made of electrical insulating material).

The two foot blocks 63 and 73 are in slideable association with the base 65 so that when the jaws 11 and 13 are moved sideways on the guide rods 31 through 34, the foot blocks 63 and 73 simply slide along therewith.

The springs 61 and 71 respectively fit into cup-like spring retainers 59 and 69 and force (or spring load) the upper jaws toward their respective lower jaws.

The embodiment shown in FIGURE 1 is to be used with a foot treadle for opening the jaws. The operating block 75 is made of electrical insulating material and is mounted in two cutouts 77 and 79 formed respectively in the upper jaws 15 and 17. The operating block 75 is connected to an operating rod 81. The rod 81 is connected to a foot pedal, not shown, so that when the foot pedal is pressed down the operating block travels with it thereby pivoting the upper jaws 15 and 17 to an open position.

In a second embodiment as shown in FIGURE 4, there is found an operating block 75 which is mounted in the two cutouts 77 and 79 by virtue of the screws 83 and 85. Mounted on block 75 is a handle 87 by virtue of which the jaws are opened by hand, instead of by the foot treadle described in FIGURE 1.

In FIGURE 1 there are shown four connection holes 89, 91, 93 and 95. Shown connected to the two lower holes 89 and 93 is a meter 97. The meter 97 in the preferred embodiment is an ohmmeter for measuring the resistance of a resistor such as resistor 99, or in the case of four terminal measurements suitable circuitry for voltage and current measurements are employed. Meter 97 can be replaced by a bridge circuit such as a parallel-resistance bridge, or a Schering bridge or the like to measure capacitance; or a bridge circuit, such as a four terminal measurement previously discussed or a Wheatstone bridge to measure resistance. Obviously, a suitable instrument to measure inductance can be substituted for meter 97 when an inductance is to be measured. The lead-in wires to the meter 97 are shown to be much longer than they actually are for purposes of easy illustration.

Examining FIGURE 1, consider the operation of the present invention when the resistance of a resistor is to be measured. The operator steps on the foot treadle (not shown) which pulls down on block 75. In turn block 75 causes the upper jaws 15 and 17 to be pivoted, on their respective swivel adapter blocks 35 and 37, to an open position. As the upper jaws 15 and 17 are opened the springs 61 and 71 are depressed. After the resistor 99 is inserted into the open jaws, the foot pedal is released and the springs 61 and 71 force the upper jaws 15 and 17 to a closed position. The jaws 11 and 13 being wide and making a firm grip on the lead wires of resistor 99 provide a good electrical contact, having very little resistance between the resistor 99 and the meter 97.

After the resistor 99 is measured, if a second resistor is to be measured, which is wider than resistor 99, the jaws 11 and 13 are moved to the right and left of block 39, until the proper distance between the jaws is ascertained. The sliding of the jaws is a relatively easy procedure and then in a similar manner as before, the second resistor is measured. If a third resistor is shorter than the second resistor, the jaws can be readily moved toward the center again. When the jaws slide on the rods 31, 32, 33 and 34 the foot blocks 63 and 73 also slide making the procedure simple.

If a component should have front positioned lugs such as those shown on the resistor 101 of FIGURE 2, the component can be easily inserted into the squared off edges of the jaws 11 and 13 and the values of the component measured.

If a double bridge procedure is to be used, the bridge lead wires are connected to both the upper holes 91 and 95 as well as the lower holes 89 and 93, and the top and bottom jaws on each side are insulated from each other as explained above.

While I have described above the principles of my invention in connection with specific apparatus, it is to be clearly understood that this description is made only by way of example and not as a limitation to the scope of my invention as set forth in the objects thereof and in the accompanying claims.

I claim:
1. A tool for testing electrical components comprising: at least first and second pairs of jaws, each pair of jaws having a stationary jaw and a moveable jaw, the moveable jaw of each pair mounted for partial rotation on its associated stationary jaw, one jaw of each pair providing means to be connected to an electrical metering device; means for simultaneously actuating said movable jaws; a pair of track members with each member thereof associated with one pair of jaws, locating means for disposing said track members parallel to the axis of said partial rotation, each pair of said jaws being slideably connected to its associated track members; said locating means including electrical insulation means connecting and separating said track members to enable said first and second pairs of jaws to be slideably separated from one another and slideably moved toward one another while being electrically insulated from one another at all points along said track to readily accommodate different sizes of electrical components to be measured.

2. A tool for testing electrical components according to claim 1 wherein there is included electrical insulating means to mount each moveable jaw with its associated stationary jaw in order to electrically insulate each jaw member from every other jaw member.

3. A tool for testing electrical components according to claim 1 wherein each of said stationary jaw members has a guide member extending therefrom in the direction toward said moveable member and each of said moveable members has an aperture therein to fit its associated guide member to allow said moveable jaw to close on said stationary jaw but not be allowed to move sideways, perpendicular to said closing motion.

4. A tool for testing electrical components according to claim 1 wherein there is further included a pair of spring means, each of which is connected to an associated moveable jaw to independently spring load said associated moveable jaw against its associated stationary jaw.

5. A tool for testing electrical components according to claim 4 wherein each of said spring means includes a foot block capable of being slideably moved so that said spring means can be easily moved when said jaws are slideably moved toward one another and away from one another.

6. A tool for testing electrical components according to claim 5 wherein there is further included an operating block means connected to said moveable jaws at the end thereof wherein said spring means are disposed to compress and expand said spring means in order to open and close said pairs of jaws.

7. A tool for testing electrical components according to claim 1 wherein said first and second pairs of jaws each have blunt front edges in order to accommodate electrical components having terminals extending from a front side thereof rather than from the ends.

References Cited

UNITED STATES PATENTS

| | | | |
|---|---|---|---|
| 1,125,253 | 1/1915 | Barber | 260—141 X |
| 2,767,893 | 10/1956 | Latson | 269—254 X |
| 2,981,919 | 4/1961 | Lamont | 324—158 X |
| 3,144,291 | 8/1964 | Swan | 324—158 X |
| 3,205,406 | 9/1965 | Pick | 324—158 X |
| 3,234,496 | 2/1966 | Cedrone | 324—158 X |

RUDOLPH V. ROLINEC, *Primary Examiner.*

WALTER L. CARLSON, *Examiner.*

E. L. STOLARUN, *Assistant Examiner.*